United States Patent [19]

Andersson et al.

[11] Patent Number: 5,385,294
[45] Date of Patent: Jan. 31, 1995

[54] LIQUID PACKAGE WITH ASEPTIC PROPERTIES AND A METHOD OF PRODUCING SUCH A PACKAGE

[75] Inventors: Par Andersson, Lutry; Werner Ruetschi, Villaz-St-Pierre, both of Switzerland

[73] Assignee: Tetra Pak Holdings S.A., Pully, Switzerland

[21] Appl. No.: 168,929

[22] Filed: Dec. 16, 1993

Related U.S. Application Data

[60] Continuation of Ser. No. 787,815, Nov. 4, 1991, abandoned, which is a division of Ser. No. 458,139, Dec. 28, 1989, Pat. No. 5,074,099.

[30] Foreign Application Priority Data

Feb. 22, 1989 [CH] Switzerland ............ 629/89

[51] Int. Cl.⁶ ............................................. B65D 43/04
[52] U.S. Cl. .................. 229/125.17; 229/3.5 MF; 220/612
[58] Field of Search ............ 220/610, 612, 626, 634, 220/642, 359; 229/125.17, 125.25, 125.35, 125.13, 3.5 MF

[56] References Cited

U.S. PATENT DOCUMENTS

| | | | |
|---|---|---|---|
| 1,715,683 | 6/1929 | Stevens | 220/608 |
| 2,332,454 | 10/1943 | Martin | 220/612 |
| 2,682,987 | 7/1954 | Spiess, Jr. | 229/35 MF |
| 3,397,814 | 8/1968 | Zackheim | 220/306 |
| 3,406,891 | 10/1968 | Buchner et al. | 229/3.5 MF |
| 3,912,110 | 10/1975 | Hammer | 220/610 |
| 3,943,682 | 3/1976 | Rausing | 53/487 |
| 3,982,658 | 9/1976 | Bozek et al. | 220/359 |
| 4,046,306 | 9/1977 | Cass | 220/612 |
| 4,057,444 | 11/1977 | Prot | 53/487 |
| 4,183,457 | 1/1980 | Laughley et al. | 229/125.17 |
| 4,373,317 | 2/1983 | Egli | 53/487 |
| 4,427,128 | 1/1984 | Heyn | 220/306 |
| 4,604,850 | 8/1986 | Reil | 53/420 |
| 4,757,936 | 7/1988 | Homma et al. | |
| 4,801,037 | 1/1989 | Hayashida et al. | 220/359 |
| 4,844,327 | 7/1989 | Pausing | |
| 4,852,793 | 8/1989 | Homma et al. | |
| 4,856,708 | 9/1989 | Giasi | 229/125.17 |
| 4,978,056 | 12/1990 | Ball et al. | 53/420 |

FOREIGN PATENT DOCUMENTS

| | | |
|---|---|---|
| 2502119 | 9/1982 | France . |
| 1958408 | 7/1971 | Germany . |
| 8703536 | 6/1987 | WIPO . |

*Primary Examiner*—Allan N. Shoap
*Assistant Examiner*—Christopher McDonald
*Attorney, Agent, or Firm*—Paul & Paul

[57] ABSTRACT

The invention describes a liquids package comprising a tube with side walls at the ends of which there are fitted a flat bottom (3) and a top which incorporates a pourer orifice, the tube consisting of paper and the bottom (3) being so welded to the tube along part of an edge by means of a plastics rim (21) that the flat main area (14) of the bottom (3) is disposed at a distance from the outer cut edge of the tube. So that the package can also be constructed for aseptic purposes and in order to render production simple and economical, it is envisaged that the bottom (3) comprise, separate from the tube, a main area (14) of paper coated with synthetic plastics material, being provided with a metal interlining, like the tube. According to the method of producing such a package, the bottom (3) is so prefabricated that its main area (14) consists of paper provided with a metal interlining, the bottom being cut therefrom and the main area (14) being connected along its marginal surface to a synthetic plastics rim (21) so that the bottom (3) prefabricated in this way can be taken from stock or can be welded on the dividing and edge.

6 Claims, 6 Drawing Sheets

LIQUID PACKAGE WITH ASEPTIC PROPERTIES AND A METHOD OF PRODUCING SUCH A PACKAGE

This application is a continuation of application Ser. No. 07/787,815 filed Nov. 4, 1991 abandoned, which is a divisional application of pending prior application Ser. No. 458,139 filed Dec. 28, 1989, now U.S. Pat. No. 5,074,099.

The invention relates to a package for liquids such as silk, juice or the like, having side walls connected to the tube via a longitudinal sealing seam, a substantially flat bottom and a top incorporating a pouring orifice, at least the tube consisting of synthetic plastics coated paper, cardboard or the like which serves as the carrier material, while the bottom is so welded to the tube along at least one partial edge by (means of a cross-sectionally at least substantially L-shaped rim) of synthetic plastics material so that its flat main surface is disposed at a distance from the outer edge at the end of the tube.

Furthermore, the invention relates to a method of producing such a package for liquids, such as milk, juice or the like, having side walls connected to the tube via a longitudinal sealing seam and at one end of which there is a top with a pouring orifice connected at least partially by integral injection moulding, while at the other end there is a bottom adapted to form a hinge along a part of an outside edge, after which the package is filled through the open bottom whereupon the bottom is folded down for sealing of the tube and is welded along the remaining part of the outer edge.

For flowable media in general and in particular for liquids, there are many types of disposable package available, the packages which are of particular interest being those which have, connected to the tube by a longitudinal sealing seam, side walls which consist of synthetic plastics coated carrier material. In the case in question here, the carrier material is paper, cardboard or the like, any one of these terms being understood as being representative of the others. It goes without saying that a liquids package has a bottom and a top with a pouring device. In this respect, there is generally a need for the package to be fluid-tight and stable while the pouring device must nevertheless be so provided that it can be opened without requiring any very great application of force.

In order to satisfy those conditions, a package already exists which has paper side walls, the bottom and top being injection moulded into place. With an injection moulding machine, it is possible, in fact, to design an embodiment for a pouring device and which is perfectly sealing-tight and which can nevertheless be easily opened. In the case of the prior art embodiment considered here, the top and bottom can be of a thermoplastics material, have no backing material, and be easily moulded onto the end edges of the side walls, because the surfaces of the side walls are coated on the inside and outside with a thin layer of synthetic plastics material.

In the manufacture of this prior art package, the procedure adopted has been that firstly the side walls are formed from paper and then, by means of the longitudinal sealing seam, shaped into a tube, after which the top is injection moulded onto an end edge of the tube. In order to be able to fill this prior art package, it has been envisaged firstly to weld the bottom only along a part of the outer edge of the tube so that as a result the bottom can be moved like a hinge in relation to the tube. In particular, the bottom is open and the package can thus be filled. After filling, the bottom is folded into the cross-section of and transversely to the longitudinal axis of the tube and is then welded along the inside along the remaining areas of the edge at the end of the tube. The package which is produced in this way is fluid-tight, can be packed in an outer container, transported, put into store, etc.

Thermoplastics materials like materials in general are not available in any desired quantity nor are they free of charge, so that it goes without saying that the manufacturer of the packages seeks to design thin synthetic plastics walls. Just like synthetic plastics coated paper, such walls are readily permeable to oxygen so that such a liquids passage would be no good for aseptic purposes.

On the other hand, packages are already known which, in order to improve the barrier properties of the package walls, are provided with walls which have a metal (interlining).

Packages are known of which the side walls and bottoms are completely and the top partially made from aluminum coated paper, the bottom being formed by folding in one end of the tube. Folding in paper which has been coated with aluminium film does, however, have the drawback of causing creases and breaks in the aluminium film so that the desired battery properties vis-a-vis oxygen are lost once again.

It is the object of the invention, therefore, to provide a liquids package of the type mentioned at the outset which is also good for aseptic uses and to make it possible to manufacture such a package by a method which is technically simple, economically viable and have every prospect of being successful.

With regard to the liquids package itself, this problem is according to the invention resolved in that the bottom comprises, separate from the tube, a main surface which consists of paper coated with synthetic plastics and which, like the tube, has a metal interlining. For the first time, these measures provide a bottom which consists of metal coated paper at the bottom end of the tube, the bottom being drawn somewhat into the tube and being welded in a fluid-tight manner, a synthetic plastics rim being used which is cross-section has preferably two flanges which are substantially L-shaped in respect of each other. In the prior art case, the entire bottom consists of thermoplastics material with no carrier material, so that in that case as well it would be possible to speak of an L-shaped synthetic plastics rim, but one which is formed in one piece with the main area of the bottom. In the case of the liquids package according to the invention, such an integral construction is out of the question because the bottom consists of paper which carriers a metal coating.

For the rest, it should be pointed out that the cross-section of the tube can be round or polygonal or it may possibly be round at one end and polygonal at the other end, with the result that the bottom and/or the top may in plan view be of the most widely diverse forms: round, polygonal, particularly circular, triangular, square, rectangular, octagonal, decagonal, dodecagonal or even trapezoidal. It will emerge from the ensuing description that, according to the invention, the bottom is produced separately and for this reason the metal coating can very easily be used for producing the bottom so that the package is not only economically interesting but is also reliable and can above all be used for holding sterile contents.

According to the invention, it is expedient for the top to have at least partially a wall panel, the edge of which is connected to a neighbouring wall in a fluid-tight manner by injection moulded bridges of synthetic plastics material. A package comprising a paper tube which has a top built up in this way is indeed already known per se. However, a liquids package has three essential parts, namely the tube, the top and the bottom and if just one of these essential parts is made in accordance with a different concept, then the entire complex of problems inherent in the liquids package changes completely. In actual fact, in the past, one has always adopted to premise that the said bridges of synthetic plastics material can be moulded onto the edges of the neighbouring wall in fluid-tight fashion but requires at least two-part moulding tools for the purpose, i.e. an outer tool and a mandrel disposed in the interior of the tube, so that manufacture of the top must always be completely before the package is filled. However, if a liquids package is filled and still open at one end, then the measures for closing it are in turn restricted by the existing material on the one hand and the level of liquid, including its instability and mobility on the other. For this reason, the block bottom closure has been regarded as particularly expedient and one has been prepared to accept the disadvantageous folding of the tube material already mentioned at the outset. According to the invention, on the other hand, the tube material is no longer folded but the bottom which consists of metal coated paper is inserted and welded.

In an advantageous further development of the invention, the flat main area of the bottom which consists of paper occupies the entire cross-sectional area of the tube and the at least substantially L-shaped synthetic plastics rim is welded around the edge of the surface of the bottom and to the inside of the rim at the top of the tube. In other words, for practical purposes, the bottom consists just of the flat main area, so that its outer cut edge is substantially crosswise to the area of the tube surrounding it. There are already various possibilities of attachment using synthetic plastics material, but according to the invention the said plastics rim with the at least two cross-sectionally L-shaped flanges is used so that the bottom is disposed at a distance from the outer cut edge of the tube and is offset somewhat inwardly.

In the case of sheet metal tins for canned food, there are already available drawn-in bottoms, the rims of which are connected in sealing-tight manner to the rim of the tube by a flanging-over process. Where paper is the carrier material, however, flanging-over is a process which is not suitable for liquids packages of this type. Therefore, the synthetic plastics rim is used. Drawing in the bottom in relation to the outer cut edge of the tube, when heat-applying jaws are used, also mating jaws are used to achieve a perfect weld. Furthermore, due to the deep drawing, the bottom is in a protected position.

The previously explained embodiment therefore represents a bottom, the metal coating of which extends as far as the outer cut edge without anywhere being folded, bent or flanged over.

In order to enhance the strength of the anchoring between this bottom and the tube, it is according to the invention further envisaged that the part of the synthetic plastics rim which is moulded at the end of the tube should be lengthened towards the interior of the tube to provide an additional overlap of the outer cut edge of the bottom. A bottom which consists of paper with the described coating is generally stamped from a web and the stamping process produces outer cut edges which are exposed with no coating, so that ideally they should not yet come in contact with any contents. Otherwise, due to capillary action, the contents would penetrate the open edge of the paper, cause it to soften and result in its destruction. By the aforedescribed lengthening of the synthetic plastics rim towards the interior of the tube, there is an L-shaped or U-shaped, which means that an additional strip is placed over the exposed edge of the paper so that the bottom which is produced in this way can no longer be destroyed by liquid penetrating the paper. Furthermore, at the critical weld point, adhesive material (thermoplastic) is applied to the synthetic material so that the bottom and tube can be even more effectively anchored. Even oxygen will encounter a thicker barrier.

Furthermore, the invention is characterised in that the part of the synthetic plastics rim which is provided at the end of the tube for additional overlap of the outer cut edge of the tube is lengthened and forms at least one L-shaped cross-section with a standing surface. Viewed in the cross-section of the plastics rim, this is an extended tongue which overlaps the outer cut edge of the tube and therefore it will subsequently constitute the standing surface when the package is completed and filled. In this way, the same synthetic plastics rim which joins the bottom to the tube will at the same time also protect the plastics-free and thus endangered outer cut edge of the tube.

According to the invention, it is furthermore advantageous if the plastics rim, of U-shaped cross section and engaging around both sides of the outer cut edge of the tube, is provided with an outer protective panel applied to the standing surface. This embodiment is still further improved, i.e. the plastics rim is, at the location in question, provided with what is in cross-section an even longer tongue than in the case of the embodiment described hereinabove, so that this longer tongue can be used not only to form a standing surface but also an outer protective panel. This plastics panel in fact protects the rim of the tube on the outside and prevents the standing surface which rests only on the outer cut edge of the tube, being stripped off when roughly handled.

In the case of another preferred embodiment of the invention, it is envisaged that the flat main area of the bottom which consists of paper should occupy the entire cross-sectional area of the tube and comprise at its outer edge connecting lugs which are articulated via fold lines, being themselves folded transversely out of the plane of the main area, alongside the rim area of the bottom and being welded to the inside of the end rim of the tube, the at least substantially L-shaped plastics rim being welded on the surface around the edge of the bottom and on the outer cut edge of the tube and on the outer cut edge of the bottom. The embodiment described here differs from that previously described in that the main area of the bottom is provided on the outside with connecting lugs so that, viewed in cross-section, the bottom has the form of a U with short, free arms, the arms being the connecting lugs which are welded to the inside of the end rim of the tube. This in itself provides a fluid-tight package, only the plastics-free outer cut edges of the connecting lugs and of the tube having to be protected. In this embodiment, it is the plastics rim which provides this protection.

In the case of another advantageously developed embodiment, in fact, the plastics rim, engaging in a U-shape in cross-section around the surface of the bottom connecting lugs and the end rim of the tube is provided with a standing surface and an outer protective panel. At this point, it should be mentioned that on the prefabricated bottom the cross-sectionally L-shaped synthetic plastics rim may have one flange so extended that its cross-section acquires the shape of a Z, the free arm of the Z being regarded as an extended tongue. This then forms the standing surface and the outer protective panel. The part of the tongue which forms the standing surface does, in fact, serve as an edge guard, lying directly on the top of the plastics-free ends of the connecting lugs and tube, the outer protective panel engaging around the outside of the tube as already explained in conjunction with the first embodiment which was described.

It may furthermore be expedient if, according to the invention, the plastics rim is connected to strengthening webs welded on the outside of the bottom. These may, for example, be cruciform or stellate and can be sealed onto the surface of the bottom with the further advantage that if there is a symmetrical construction in the centre of the strengthening webs, preferably of the cross or star, the supply of plastics material can take place in the manufacturing machine. As it happens, a man skilled in the art knows that with a central supply of synthetic plastics material, it is always possible to achieve a particularly well constructed rim or marginal portion, because the flow paths of the hot liquids thermoplastics material are in this case equally long in every direction. The design of the entire liquids passage is particularly advantageous if, according to the invention, the flat main area of the bottom is square and comprises four elongated connecting lugs. Another alternative embodiment is characterised in that the flat main area of the bottom ha a circular periphery and comprises a plurality of small, preferably triangular, connecting lugs.

Notwithstanding the actual design of the top or bottom, the package according to the invention can be readily used for transporting or storing sterile liquids because the side walls, the top and the bottom, can be constructed from materials (paper with a metal coating) which have good barrier properties vis-a-vis oxygen. The synthetic plastics bridges are made sufficiently thick at the edge of the wall panels of the top so that a relatively good barrier quality is assured. The bottom and its connection with the tube is described in detail hereinabove, together with the corresponding good barrier properties for oxygen.

The method mentioned at the outset for producing the package is, in order to resolve the problem, characterised in that the bottom is prefabricated, in fact so that a main area occupying the entire cross-sectional area of the tube is cut from paper or the like provided with a metal interlining and coated with synthetic plastics material and connected along its edge surface to an at least substantially L-shaped synthetic plastics rim and in that the prefabricated bottom is take from stock or is welded to or injection moulded on the part of the end edge of the tube when the plastics rim is prepared.

In contrast to the prior art package described at the outset, in which top and bottom consist of synthetic plastics material with no carrier material and are so mounted on the tube in a single injection moulding tool that the top is closed and the bottom is left open, the method according to the invention operates with two separate injection moulding tools. The first is used for making the top. The second, separate injection moulding tool is used for producing the bottom which, in the manner described above, is first taken from stock in a first stage (or is fitted when the plastics rim is being attached) and is welded to the tube along just one partial edge. Indeed, the effect here, as with the prior art packing, is that the package can be filled from the bottom. However, the bottom is differently constructed and is made from different materials, so that the known production method cannot be used. The prefabricated bottom is fed to the welding machine or at least the main area of the bottom is prefabricated and is produced together with the plastics rim in this second separate injection moulding tool, being thereby welded to an outer part of the edge of the tube.

If one considers the first embodiment described, which has no connecting lugs and in which the flat main area of the bottom occupies the entire cross-sectional area of the tube, then one strip of the plastics rim, i.e. in cross-section one arm of the L which, in fact, projects transversely from the main area of the bottom, can be regarded as a connecting part by means of which the flat bottom, which has no lugs, is attached to the inside of the end rim of the tube. In the case of the other embodiment, the second embodiment described, in which the at least one connecting lug is welded to the inner end rim of the tube, the connecting lug therefore consists of paper coated with synthetic plastics material and/or metal.

Also in the case of the connecting lugs, according to the teaching of this invention, the bottom is first prefabricated, kept in stock and then welded to the edge of the tube or at least is so prepared that the plastics rim is already partially injection moulded on the connecting lugs and at least one connecting lug is moulded on part of the outer edge of the tube. Furthermore, according to the invention, for this embodiment the method is characterised in that for prefabricating the bottom the main area with the connecting lugs articulated on its is stamped out, after which the lugs are folded up and the plastics rim having an at least L-shaped cross-section is injection moulded on the edge of the surface of the bottom and on the connecting lugs with a projecting tongue which will subsequently form a standing surface and/or outer protecting panel. If, for instance, the bottom is square, a square paper panel coated with metal is cut out, the corners being furthermore being so stamped out that the connecting lug are created between the corners. Suitable grooving provides for fold lines along which the connecting lugs can be folded transversely out of the plane of the main area. During prefabrication of the bottom, therefore, the plastics rim is injection moulded on the connecting lugs and so sets them in the folded-up position. The bottom kept for example in stock, then has a plastics rim with a tongue projecting outwardly in a plane parallel with the main area of the bottom and which later will constitute the standing surface and/or the outer protecting panel.

According to the invention, it is thereby expedient if, for attachment of the bottom which is preferably prefabricated by a separate injection tool, firstly at least one connecting lug is fixed to the end rim of the tube on the inside by an induction welding process, whereupon the projecting tongue of the plastics rim is bent in a U-shape around the connecting lug of the bottom and the end rim of the tube and is rigidly welded from the outside. This rigid welding can be an ultra high frequency welding process or may involve the use of hot shoes, if one does not wish to use the effect of the metal coating or if no metal coating is provided. Naturally, induction welding presupposes the presence of the metal coating and is preferably used if firstly the connecting lug is to be fixed to the end rim of the tube, in which case this is a further inner welding. Heat applying shoes could not convey the necessary welding heat from the outside all the way to this inner location.

Further advantages, features and possible applications of the present invention will emerge from the ensuing description of preferred embodiments which are shown in the accompanying drawings, in which.

Figure 3:
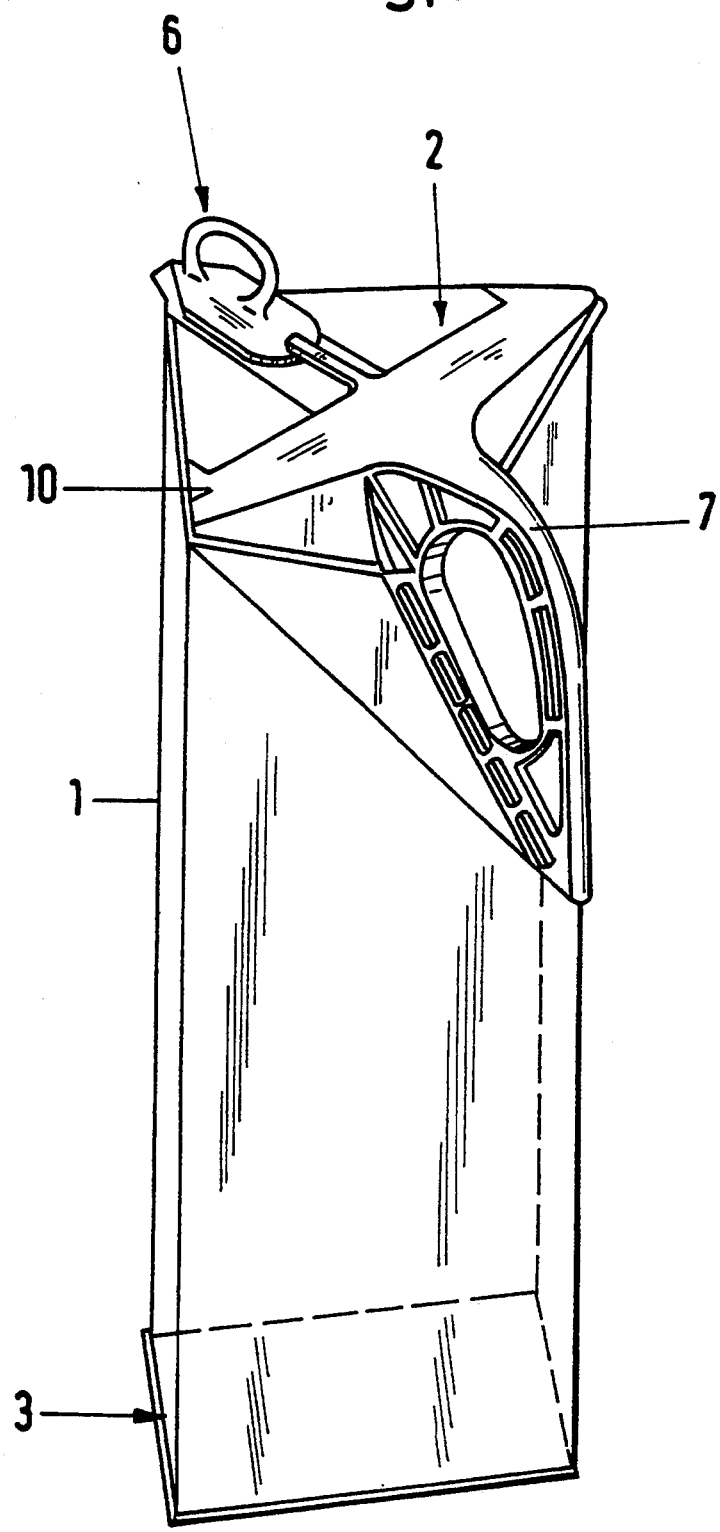
Figure 4:
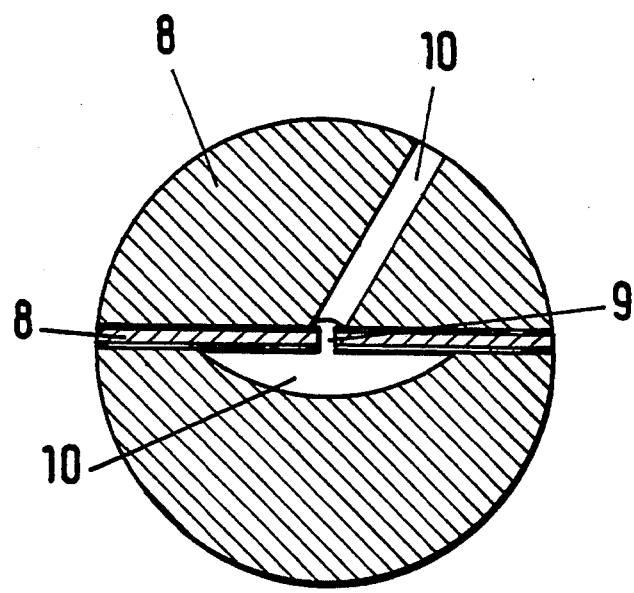
Figure 5:
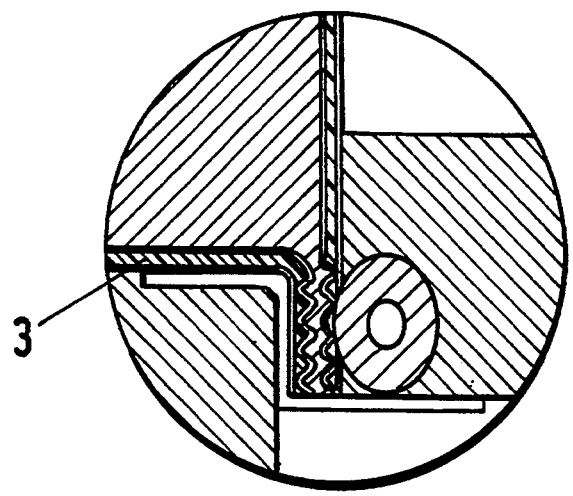
Figure 6:
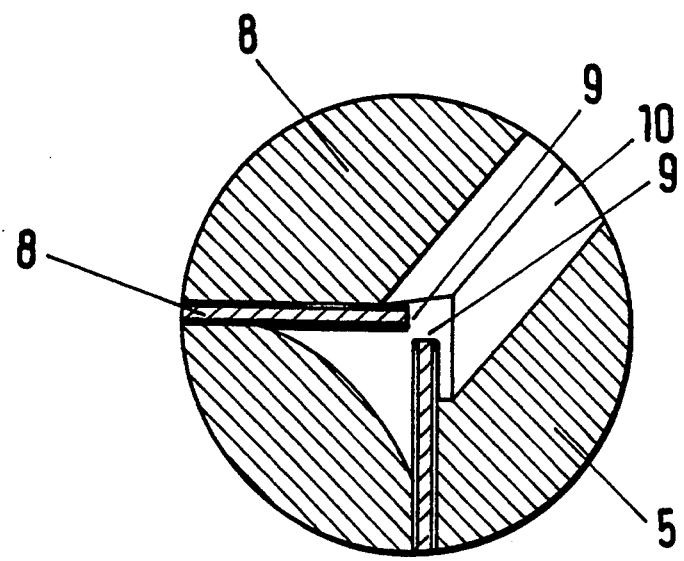
Figure 7:
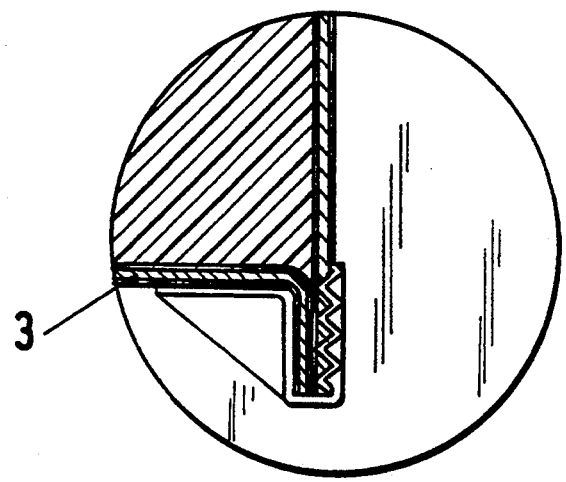
Figure 8:
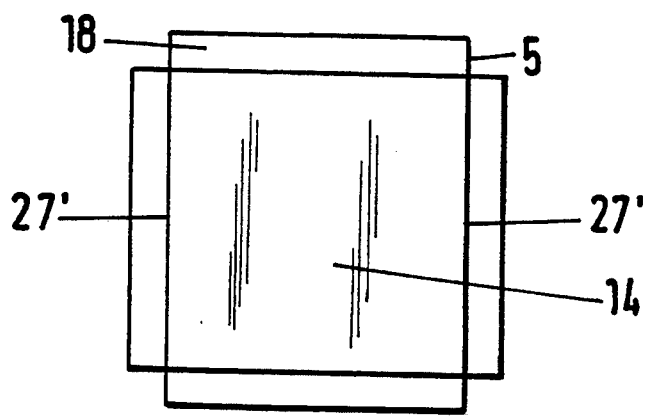
Figure 9:
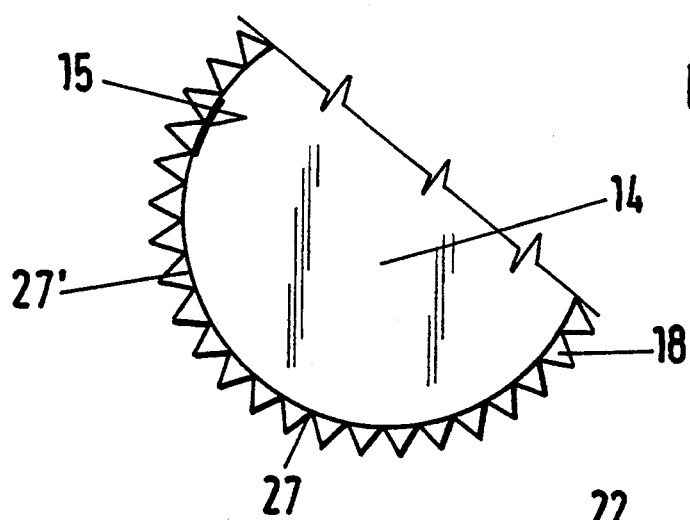
Figure 10:
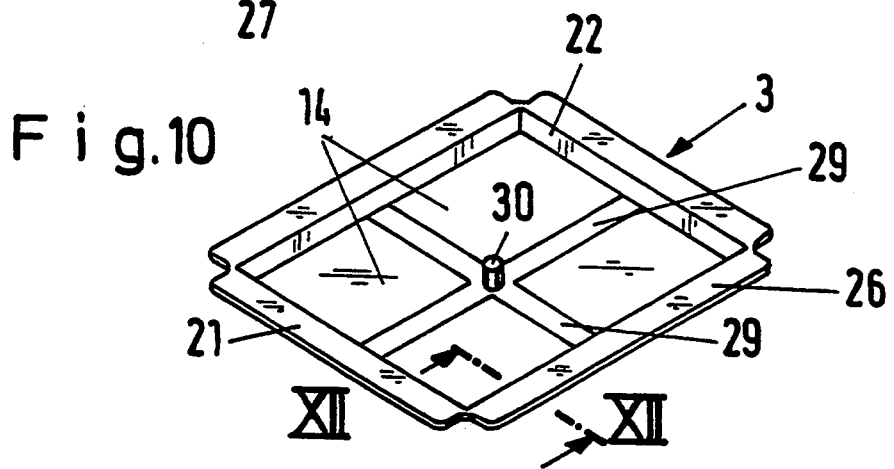
Figure 11:
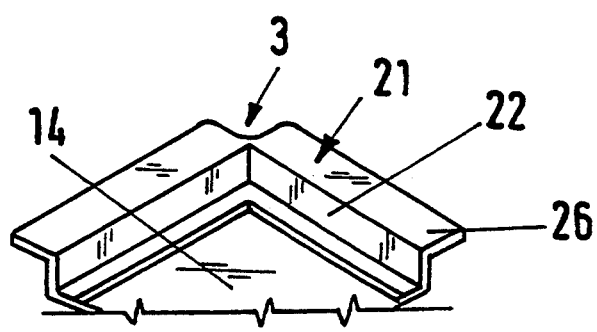
Figure 12:
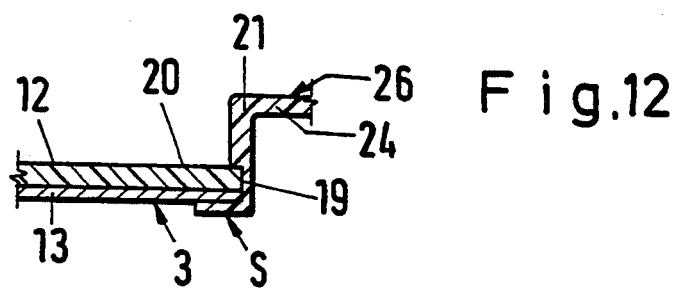
Figure 13:
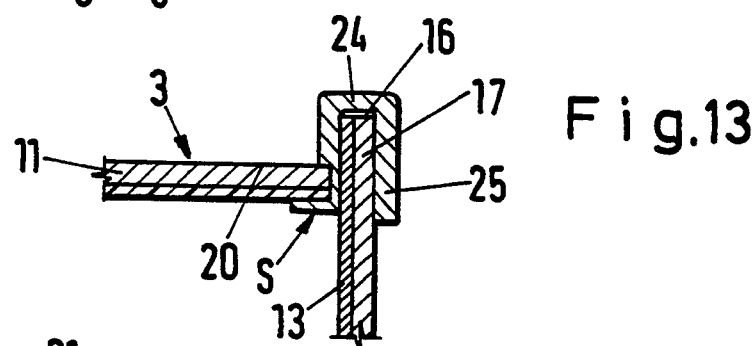
Figure 14:
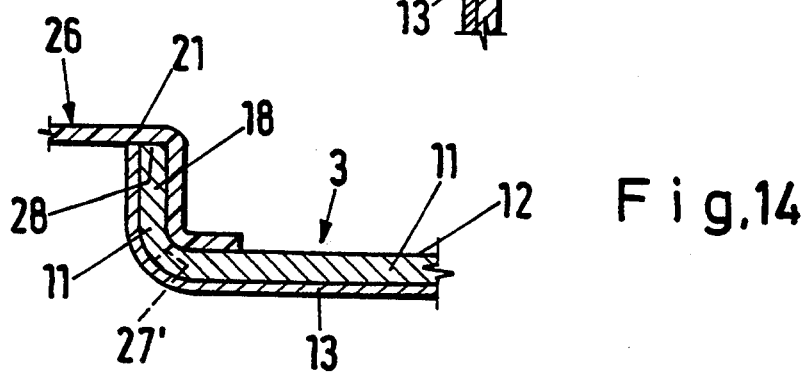
Figure 15:
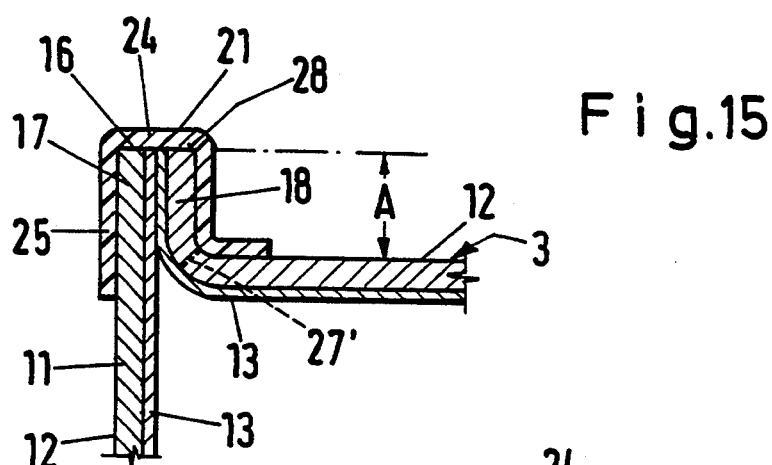
Figure 16:
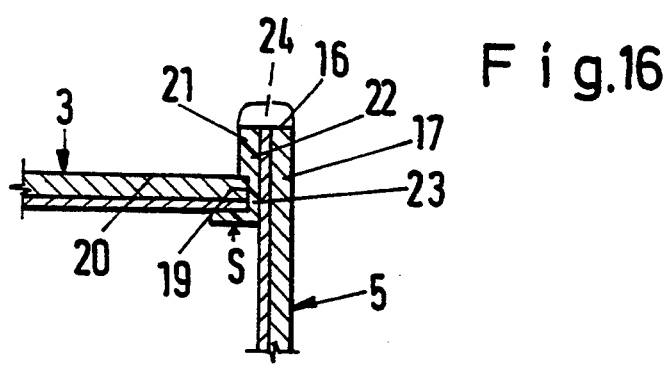

FIG. 3 likewise is a perspective view of another and third embodiment;

FIG. 4 is a perspective cut-away detail from FIG. 3 on an enlarged scale;

FIG. 5 is a cross-sectional view of the bottom edge during the induction welding and while the plastics rim is still Z-shaped;

FIG. 6 is another perspective and broken-away detail on the top side of the package in FIG. 3, on an enlarged scale;

FIG. 7 is a view similar to that in FIG. 9, but in which the tools are removed and the tongue of the plastics strip has been folded over and sealed to form the outer protective panel;

FIG. 8 is a plan view of a square bottom with connecting lugs, shown as a prepared blank;

FIG. 9 shows the blank of a circular bottom with triangular connecting lugs;

FIG. 10 is a perspective view of the prefabricated bottom in a square shape with the substantially Z-shaped plastics rim;

FIG. 11 is a view similar to that in FIG. 10 but broken away and showing a different embodiment with no reinforcing webs;

FIG. 12 is a broken away cross-sectional view taken on the line XII—XII in FIG. 10;

FIG. 13 is a broken away cross-sectional view through the bottom end rim of the tube with a welded on plastic rim;

FIG. 14 is a view comparable to that in FIG. 12 but showing a different embodiment, for example according to FIG. 11;

FIG. 15 is a view comparable to that in FIG. 13 but showing a different embodiment in which the bottom comprises connecting lugs as in FIGS. 11 and 14, and FIG. 16 is a broken away cross-sectional view similar to that in FIG. 13 but in which the plastics strip is shown in two different embodiments, L-shaped and Z-shaped.

The liquids package described here comprises a tube 1 having a longitudinal sealing seam 4 by means of which the plastics and metal coated paper web is formed into a tube 1, during which process the walls 5 are formed. At the top, the package is closed by a top 2 while it is closed at the bottom by a bottom 3. The top 2 is provided with a pourer orifice generally designated 6.

Figure 1:
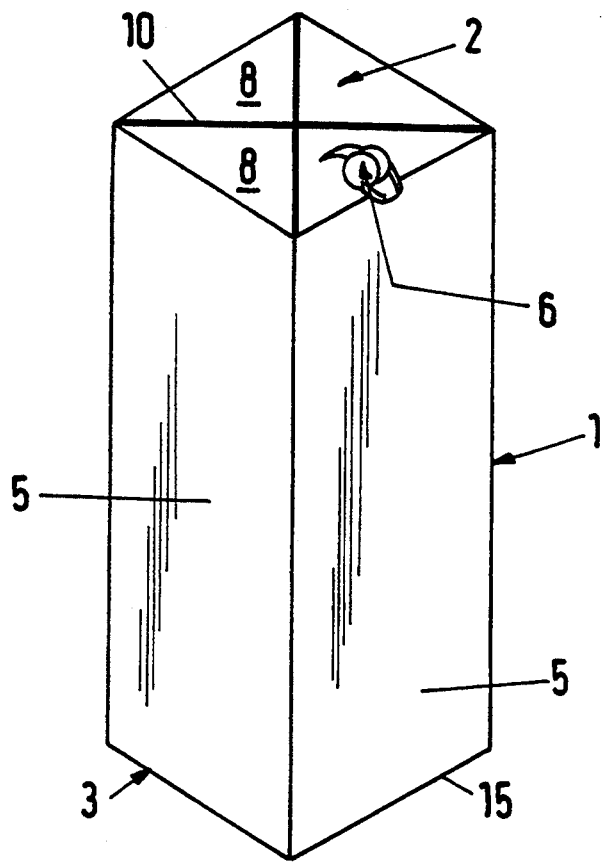
FIG. 1 is a perspective view of a first embodiment of a package according to the invention, which is of parallelepiped shape.
Figure 2:
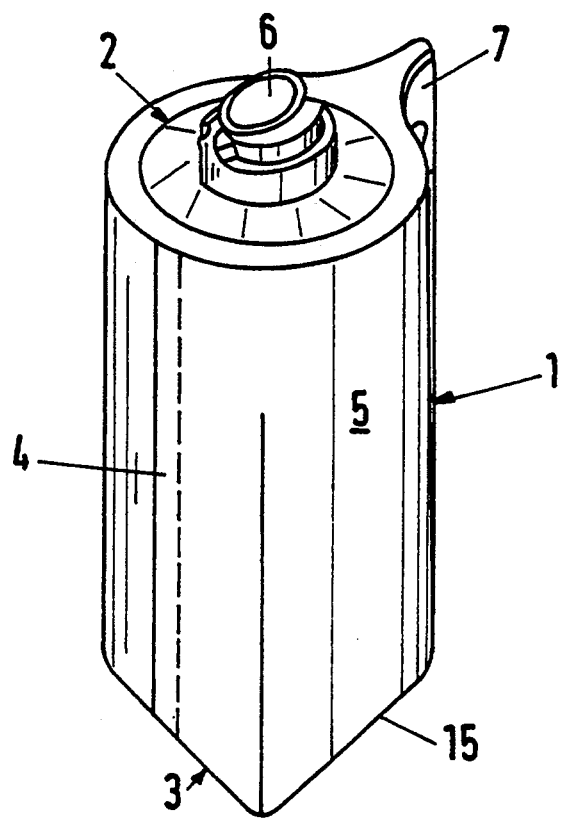
FIG. 2 shows a second embodiment of a perspectively illustrated package having a square bottom and a round top.

The embodiment shown in FIG. 1 has in plan view a square bottom 3 and a square top 2, while the embodiment shown in FIG. 2 similarly has a square bottom but in this case the top 2 is circular. On the other hand, the top 2 of the embodiment in FIG. 3 is trapezoidal or triangular.

While in all three embodiments the bottom is prefabricated separately and then welded on, the top 2 according to the embodiment in FIGS. 2 and 3 consists of thermoplastics material with no paper or cardboard and is welded into place together with the handle 7.

In the case of the embodiment shown in FIG. 1, the top is formed by four folded over wall panels 8 constructed in one piece with the tube 1. The edges 9 of these wall panels 8—this is also true of the side walls 5 at the corner portions (FIG. 6)—are connected to one another in a fluid-tight manner by injected bridges 10 of synthetic plastics material.

What is novel of the package described here, in all its embodiments, is the construction of the package material which is shown particularly clearly in FIGS. 12 to 16. The carrier material here is the paper 11, which might also be described as cardboard. One surface, which in most cases will later be disposed on the outside of the package, carries a thin coating of synthetic plastics material 12 while on the other side which will subsequently be in most cases facing the interior of the package is more tightly coated with a plastics-encased metal interlining 13 (mostly an aluminium foil). This material construction is already known per se.

Whereas FIGS. 1 to 3 do not very clearly show the bottom 3, this is more clearly illustrated in FIGS. 5 and 7 to 17 in various embodiments in plan view, perspective view, and in broken away sections. Where the finished package is concerned, the bottom which is generally designated 3 has as flat main area 14 consisting of paper 11 coated with synthetic plastics material 12 and aluminium foil 13 and in FIG. 8 it is shown quadratically within the four inner corners, while in FIG. 9 it is circular and in the embodiments shown in FIGS. 10 and 11 it is rectangular. In the case of the embodiment shown in FIGS. 1 to 3, the boundary line shown on the right at the front might be considered to be the dividing edge 15 (which in the case of a circular construction according to FIG. 9 might, for example, be the more thickly indicated area shown at the top on the left), along which during the course of the production process, when the tube 1 is completed together with the top 2, the bottom 3 is disposed so that is projects therefrom is such a way that the package is open at the bottom and so that it can be filled through the bottom. Only after then is the bottom 3 folded down so that the main area 14 of the bottom 3 occupies the entire cross-sectional area of the tube 1 which, except for the embodiment in FIG. 9, is square or rectangular in the other embodiments shown here. As with the prior art preserved foods cans, the flat main area 14 of the bottom 3 is offset inwardly by a distance from the outer end edge or standing surface. This position in shown in FIGS. 13, 15 and 16, where the distance in FIG. 15 from the outer cut edge 16 of the tube 1 is designated A. The area below the outer cut edge 16 of the tube above the height A is here referred to as the end rim 17 of the tube 1.

The bottom 3 of all the embodiments shown here is so prefabricated that the main area 14 is cut, for example as a square (without connecting lugs 18) from paper 11 provided with a metal interlining 13 and coated with synthetic plastics material 12 and which occupies the entire cross-sectional area of the tube 1. Consequently, this main area 14 has an outer edge 19 which is clearly shown in FIG. 16. After the stamping process, this has no plastics coating and is therefore sensitive to any penetration of liquid. In the case of the embodiments shown in FIGS. 10, 12, 13 and 16, a cross-sectionally at least L-shaped synthetic plastics rim 21 is welded onto the surface 20 of the rim which is above the outer cut edge 19 and consists of various portions, as can be best understood from the cross-sectional views in FIGS. 12 to 16.

Under the surface 20 of the rim of the bottom 3, FIGS. 12, 13 and 16 show one leg S of the plastics rim 21 of which the second leg 22 is formed to project transversely from the main area 14.

The outer cut edge 19 of the bottom 3 is furthermore overlapped by this second leg 22 of the L-shaped plastics rim 21 which extends downwardly, i.e. towards the leg S and thus towards the interior of the package, which it is provided with an extension 23 so that the plastic rim 21 has an L-shaped cross-section. This is shown in FIG. 16 if one initially disregards the broken-line extension of the leg 22 of the plastic rim 21 which is shown at the top. In other words, the extension 23 represents, extending beyond the outer cut edge 19 of the bottom, an extension of the part 22 of the plastics rim 21 which is further extended by the leg S and which is mounted on the end rim 17 of the tube 1. Furthermore, referring to the embodiments in FIGS. 12 and 16, it can be seen here that in fact this part 22 of the plastics rim 21 which is mounted on the end rim 17 of the tube 1 is for additional overlapping of the outer cut edge 16 of the tube 1 extended outwardly by a standing area 24. This part 24 of the plastics rim 21 can be further extended so that subsequently it is possible to form an outer protective panel 25. These two parts, which can be seen in the finished package in the bottom area (standing surface 24 and outer protective panel 25) together form a tongue 26 which is shown in FIGS. 10 to 12 and 14.

Another embodiment of the bottom 3 is shown in FIGS. 8 and 9. Here, again, the flat main area 14 of the bottom 3 occupies the entire cross-sectional area of the tube 1, but on its outer edge 27 there are fold lines 27' via which connecting lugs 18 are articulated. It can be seen from the view in FIG. 15 that these connecting lugs 18 are folded out of the plane of the main area 14 alongside the marginal area 20 of the bottom 3 to stand upright (by the height A). This can also be seen in FIG. 14. When fitting the bottom 3 according to FIG. 14 on the end rim 17 of the tube 1, then, the connecting lugs 18 are so welded on that the aluminium interlining 13 with its plastics sheath in the lug 18 is fused on the one hand to the interlining 13 with its plastics coating and on the end rim 17 on the other.

FIG. 15 furthermore shows that the synthetic plastics rim 21 with its standing surface 24 in this case not only encloses the outer cut edge 16 of the tube 1 in a U-shaped configuration but also the outer cut edge 28 of the bottom 3 which cannot here be confused with the outer edge 19 of the other embodiment shown in FIG. 12.

It can furthermore be seen in FIG. 10 that the plastics rim 21 is alongside the surface 20 of the rim of the bottom 3 connected to welded-on reinforcing webs 29 which are in this case cruciform in disposition. In the middle of the cross can be seen a small nipple 30 which represented the supply of synthetic plastics material during production of the floor. In fact, the plastics rim 21 can be constructed completely and particularly well if the supply of plastics material is effected centrally and if the paths travelled outwardly are always the same, the reinforcing webs 29 representing these flow paths during production.

We claim:

1. A package for liquids having side walls (5) connected to form a tube (1) via a longitudinal sealing seam (4), a substantially flat bottom (3) and a top (2) comprising a pourer orifice (6), the tube (1) comprising a metal interlining connected to a carrier material, the bottom (3) having at least one partial edge (15) welded to the tube (1) via a cross-sectionally at least substantially L-shaped synthetic plastic rim (21) so that a flat main area (14) is at a distance (A) from an outer end edge (16) of the tube (1), characterized in that the rim (21) is injection molded to the bottom (3) and serves as a permanent connecting piece between the tube (1) and the bottom (3), which bottom (3) comprises, separate from the tube (1), a main area (14) which consists of paper which is coated with synthetic plastic material (12) and is provided with a metal interlining (13), and further comprises plastic reinforcing webs (29) attached thereto, the reinforcing webs (29) being integrally formed with the rim (21).

2. A package according to claim 1, characterised in that top (2) comprises at least partially a wall panel (8) an edge (9) of which is bonded in fluid-tight manner to a neighbouring wall (5) by means of injection moulded bridges (10) of synthetic plastics material.

3. A package according to claim 1 or 2 characterised in that the flat main area (14) of the bottom (3) which consists of paper occupies the entire cross-sectional area of the tube (1) and in that the at least substantially L-shaped synthetic plastics rim (21) is welded to the edge of the surface (20) of the bottom (3) and to the inside of an end rim (17) of the tube (1).

4. A package according to claim 3, characterised in that a part (22) of the plastics rim (21) which is moulded on the end rim (17) of the tube (1) is for additional masking of an outer cut edge (19) of the bottom (3) extended (23) towards the interior of the tube (1).

5. A package according to claim 3, characterised in that the part (22) of the plastics rim (21) which is mounted on the end rim (17) of the tube (1) is for additional over-lapping of the outer cut edge (16) of the tube (1) extended to form at least an L-shaped cross-section with a standing surface (24).

6. The package according to claim 5 characterised in that the synthetic plastics rim (21) which engages in a cross-sectionally U-shaped manner around the outer cut edge (16) of the tube (1) is provided with an outer protective panel (25) mounted on the standing surface (24).

* * * * *

UNITED STATES PATENT AND TRADEMARK OFFICE
CERTIFICATE OF CORRECTION

PATENT NO. : 5,385,294
DATED : January 31, 1995
INVENTOR(S) : Andersson et al.

It is certified that error appears in the above-indentified patent and that said Letters Patent is hereby corrected as shown below:

Title page, item [57], insert last line after "dividing" and before "edge" --and-- should be --end--;

Column 1, line 12 the first word before "juice" --silk-- should be --milk--;

Column 3, line 19 the first word before "before" --completely-- should be --completed--;

Column 5, line 34 after "bottom" and before "a" --ha-- should be --has--;

Column 8, line 46 after "from" and before "such" --is-- should be --in--;

UNITED STATES PATENT AND TRADEMARK OFFICE
CERTIFICATE OF CORRECTION

PATENT NO. : 5,385,294
DATED : January 31, 1995
INVENTOR(S) : Andersson et al.

It is certified that error appears in the above-indentified patent and that said Letters Patent is hereby corrected as shown below:

Column 8, line 47 second word before "so that" --and-- should be --end--;

Claim 4, Column 10, line 45 after "which is" --moulded-- should be --mounted--.

Signed and Sealed this

Fifth Day of September, 1995

BRUCE LEHMAN

Attest:

Attesting Officer      Commissioner of Patents and Trademarks